(12) United States Patent
Wang et al.

(10) Patent No.: US 7,273,897 B2
(45) Date of Patent: Sep. 25, 2007

(54) INK JET INK COMPOSITION

(75) Inventors: Jin-Shan Wang, Pittsford, NY (US);
Huijuan Chen, Webster, NY (US);
Steven Evans, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 535 days.

(21) Appl. No.: 09/918,584

(22) Filed: Jul. 31, 2001

(65) Prior Publication Data
US 2003/0056690 A1 Mar. 27, 2003

(51) Int. Cl.
*C08L 18/00* (2006.01)
*C08L 63/02* (2006.01)
*C08L 69/26* (2006.01)

(52) U.S. Cl. .............. 523/160; 524/590; 524/601; 524/606; 524/612; 528/44; 528/272; 528/335

(58) Field of Classification Search ............... 523/160, 523/161; 528/272, 274, 296, 335, 336; 524/556, 524/601, 606
See application file for complete search history.

(56) References Cited

U.S. PATENT DOCUMENTS

| 4,644,708 | A |   | 2/1987  | Baudot et al. |
| 5,073,448 | A | * | 12/1991 | Vieira et al. ............. 428/331 |
| 5,098,475 | A |   | 3/1992  | Winnik et al. |
| 5,136,014 | A | * | 8/1992  | Figuly ................. 528/272 |
| 5,266,106 | A |   | 11/1993 | Breton |
| 5,596,027 | A | * | 1/1997  | Mead et al. ............. 523/161 |
| 5,929,134 | A | * | 7/1999  | Lent et al. ............. 523/161 |
| 6,001,161 | A | * | 12/1999 | Evans et al. ........... 106/31.48 |
| 6,025,412 | A | * | 2/2000  | Sacripante et al. ....... 523/161 |
| 6,124,411 | A | * | 9/2000  | Matyjaszewski et al. ... 526/111 |
| 6,252,025 | B1 | * | 6/2001 | Wang et al. ............. 526/292.9 |
| 6,300,424 | B1 | * | 10/2001 | Frechet et al. ........... 525/444 |
| 6,312,679 | B1 | * | 11/2001 | Tomalia et al. ......... 424/78.08 |
| 6,431,700 | B1 | * | 8/2002  | Chen et al. ............. 347/100 |
| 6,468,338 | B1 | * | 10/2002 | Evans et al. ............. 106/31.5 |

FOREIGN PATENT DOCUMENTS

WO    97/26294    7/1997

OTHER PUBLICATIONS

Alger, Mark; Polymer Science Dictionary $2_{nd}$ Edition, Chapman & Hall, London, 1989 (p. 407).*
Kim Y H: "Highlight Hyperbranched Polymers 10 Years After" Journal of Polymer Science, Polymer Chemistry Edition, John Wiley and Sons, New York, US, vol. 36, 1998, pp. 1685-1698.

* cited by examiner

*Primary Examiner*—Callie Shosho
(74) *Attorney, Agent, or Firm*—Harold E. Cole; Kathleen Neaner Manne

(57) ABSTRACT

An ink jet ink composition of water, a humectant, and a hyperbranched polymeric dye of a hyperbranched polymer having a dye chromophore pendant on the polymer chain or incorporated into the polymer backbone.

10 Claims, No Drawings

INK JET INK COMPOSITION

CROSS REFERENCE TO RELATED APPLICATIONS

Reference is made to commonly assigned, co-pending U.S. patent application Ser. Nos.:
U.S. Pat. No. 6,457,822 by Chen et al.;
U.S. Pat. No. 6,541,599 by Wang;
U.S. Pat. No. 6,541,600 by Wang et al.;
U.S. Pat. No. 6,525,170 by Wang et al.; and
U.S. Pat. No. 6,353,082 by Wang.

FIELD OF THE INVENTION

This invention relates to an ink jet ink composition comprising a hyperbranched polymeric dye comprising a hyperbranched polymer having a dye chromophore pendant on the polymer chain or incorporated into the polymer backbone.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Inkjet printers have found broad applications across markets ranging from industrial labeling to short run printing to desktop document and pictorial imaging.

The inks used in the various inkjet printers can be classified as either dye-based or pigment-based. A dye is a colorant which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc.

In traditional dye-based inks, no particles are observable under the microscope. Although there have been many recent advances in the art of dye-based ink jet inks, such inks still suffer from deficiencies such as low optical densities on plain paper and poor light-fastness. When water is used as the carrier, such inks also generally suffer from poor water fastness and poor smear resistance. These problems can be minimized by replacing the dyes used in ink formulations with insoluble pigments. In general, pigments are superior to dyes with respect to waterfastness, lightfastness, and stability towards pollutants in the air. However, the pigment inks tend to be unstable and settle out from the liquid vehicle over a long storage time. Pigment inks also have a tendency to clog the orifices of the printhead resulting in deterioration of print quality.

Accordingly, there is a need for inks having advantages of both dye-based inks and pigment based inks that have good lightfastness, stability towards pollutants, waterfastness and reliability in the printhead.

Polymeric colorants, such as polymeric dyes are known. In comparison with ordinary colorants, polymeric colorants offer the advantage of allowing a range of physical properties. Their solubility, absorption, migration, and viscosity are tunable and they do not sublime, are non-abrasive, and generally have low toxicity.

U.S. Pat. No. 4,644,708 discloses an ink composition comprising water and a polymeric dye comprised of the reaction product of a water-soluble polymer with a reactive dye. However, there is a problem with this dye in that its viscosity is high, resulting in poor firability from a thermal ink jet printhead.

U.S. Pat. No. 5,098,475 discloses the preparation of dendrimeric dyes by reacting a dendrimer with a dye and using the dendrimeric dye in ink formulations. However, there is a problem with these dendrimeric dyes in that dendrimers are typically prepared through lengthy multi-step syntheses, and their availability is limited to a small group of functional monomers.

It is an object of this invention to provide an ink jet ink composition that, when printed, provides an image which has improved waterfastness, lightfastness, and stability towards pollutants such as ozone. It is another object of the present invention to provide an ink jet ink composition that has improved firability through an ink jet printhead.

SUMMARY OF THE INVENTION

These and other objects are achieved in accordance with this invention which relates to an inkjet ink composition comprising water, a humectant, and a hyperbranched polymeric dye comprising a hyperbranched polymer having a dye chromophore pendant on the polymer chain or incorporated into the polymer backbone.

It has been found that this ink jet ink composition, when printed, provides an image which has improved waterfastness, lightfastness, and stability towards pollutants such as ozone and has improved firability through an ink jet printhead.

DETAILED DESCRIPTION OF THE INVENTION

Any hyperbranched polymer may be used in the invention to which is attached a pendant dye chromophore or which has a dye chromophore incorporated into the polymer backbone. A hyperbranched polymer is defined as a polymer formed by polymerization of one or more branching monomers as described in J. Am. Chem. Soc., 74, p2718 (1952), the disclosure of which is hereby incorporated by reference. In general, hyperbranched polymers can be made through chain polymerization or condensation polymerization processes, as described in U.S. Pat. No. 4,857,630, the disclosure of which is hereby incorporated by reference.

Hyperbranched polymers which may be used in this invention containing a dye either as a pendant group or in the backbone are described in U.S. Pat No. 6,541,600 by Wang et al., and U.S. Pat. No. 6,252,025, the disclosures of which are hereby incorporated by reference.

In a preferred embodiment of the invention, the hyperbranched polymer having a dye chromophore pendant thereto which may be used has the formula:

HB-D$_n$ wherein:
HB is a hyperbranched polymer core;
D is a dye moiety; and
n is an integer of at least 2.

In another preferred embodiment, HB is a polyamide, polyester, polyether, vinylic polymer, polyimine, polysiloxane, polyesteramide or polyurethane.

In still another preferred embodiment of the invention, HB is prepared by a chain polymerization of a monomer of the formula $M^1$-$R^1$-$M^2{}_m$ wherein (i) $R^1$ is a linear or branched alkyl, carbonyl, or aromatic moiety; (ii), $M^1$ and $M^2$ are reactive groups that react independently of each other in which $M^1$ is a polymerization group and $M^2$ is a precursor of a moiety $M^{2*}$ which initiates the polymerization of $M^1$ as a result of being activated; and (iii), m is an integer of at least 1.

In another preferred embodiment of the invention, HB is prepared by a condensation or addition polymerization of a monomer of the formula $M^3$-$R^2$-$M^4{}_p$ wherein (i) $R^2$ is a linear or branched alkyl or aromatic moiety; (ii), $M^3$ and $M^4$ are groups that undergo a condensation or addition reaction; and (iii), p is an integer of at least 2.

In another preferred embodiment of the invention, HB is prepared by a condensation or addition polymerization of a monomer of the formula $R^2$-$M^5{}_q$ and $R^3$-$M^6{}_t$ wherein (i) $R^2$ is as defined above and $R^3$ is a linear or branched alkyl or aromatic moiety; (ii), $M^5$ and $M^6$ are groups that undergo a condensation or addition reaction; and (iii), q is an integer of at least 2 and t an integer of at least 3.

In another preferred embodiment of the invention, $M^1$ is a non-substituted or substituted vinylic group, $M^2$ is X, —CH$_2$X or —CH(CH$_3$)X wherein X is Cl, Br, I, S—C(=S), YR$^4$R$^5$ or —O—NR$^4$R$^5$, Y=O or N, and $R^4$ and $R^5$ are each independently —(CH$_2$)$_r$(r=1-12), —C$_6$H$_5$, —C(O)O, or C(O).

In another preferred embodiment of the invention, $M^3$ and $M^4$ are each independently —COOH, —OH, —C(O)Cl, epoxy, anhydride, NH, or NH$_2$, and $R^2$ is —C$_6$H$_3$—, or —(CH$_2$)$_S$—C(R$^6$)— wherein R$^6$ is a linear or branched alkyl or aromatic group and s is an integer of 1-12.

In another preferred embodiment of the invention, $M^5$ and $M^6$ are each independently —COOH, —OH, —C(O)Cl, epoxy, anhydride, NH or NH$_2$, $R^3$ is —C$_6$H$_4$—, —C$_6$H$_4$—O—C$_6$H$_4$—, —C$_6$H$_3$, N(CH$_2$)$_3$—, —C$_4$H$_8$—, —C$_6$H$_{10}$—,

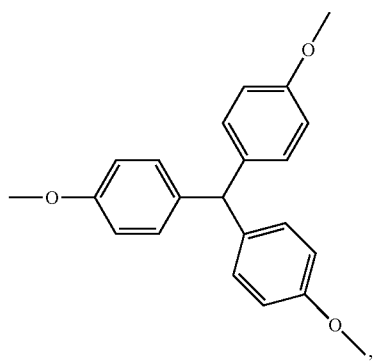

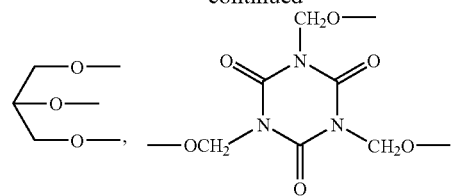

The dye chromophores which may be used in the present invention generally include any of the reactive dyes capable of reacting with the hyperbranched polymer to become attached thereto. The bond between the hyperbranched polymer and dye can be a covalent bond or an ionic bond. These dyes typically comprise a chromophore, such as a mono- or poly-azo dye, such as a pyrazoleazoindole dye as disclosed in U.S. patent application Ser. No. 09/689,184 filed Oct. 12, 2000; a basic dye, a phthalocyanine dye, a methine or polymethine dye, a merocyanine dye, an azamethine dye, a quinophthalone dye, a thiazine dye, an oxazine dye, an anthraquinone, or a metal-complex dye, such as those described in U.S. Pat. Nos. 5,997,622 and 6,001,161, i.e., a transition metal complex of an 8-heterocyclylazo-5-hydroxyquinoline.

In still another preferred embodiment of the invention, the hyperbranched polymeric dyes (HBPD) have dye chromophores incorporated into the polymer backbone. These hyperbranched polymeric dyes can be prepared by any kind of polymerization process, similar to those described above for HB. At least one of the monomers used to prepare HBPD contains a dye chromophore.

In a preferred embodiment, the hyperbranched polymer having a dye chromophore incorporated into the polymer backbone is prepared by a chain polymerization of a monomer of the formula $M^1$-$R^7$-$M^2{}_m$ wherein $R^7$ is a linear or branched alkyl, carbonyl, or aromatic moiety containing a dye chromophore and $M^1$, $M^2$ and m are defined above.

In another preferred embodiment, the hyperbranched polymer having a dye chromophore incorporated into the polymer backbone is prepared by a condensation or addition polymerization of a monomer of the formula $M^3$-$R^7$-$M^4{}_p$ wherein $R^7$, $M^3$, $M^4$ and p are defined above.

In still another preferred embodiment, the hyperbranched polymer having a dye chromophore incorporated into the polymer backbone is prepared by a condensation or addition polymerization of a monomer of the formula $R^8$-$M^5{}_q$ and $R^9$-$M^6{}_t$ wherein $R^8$ and $R^9$ are each independently a linear or branched alkyl or aromatic moiety, at least one of which contains a dye chromophore, and $M^5$, $M^6$, q and t are defined as above.

In yet still another preferred embodiment, the hyperbranched polymer having a dye chromophore incorporated into the backbone thereof is a polyamide, polyester, polyether, vinylic polymer, polyimine, polyesteramide or polyurethane.

In another preferred embodiment of the invention, the dyes used to prepare the hyperbranched polymeric dyes generally include any of the reactive dyes with at least two reactive groups capable of reacting with itself (homopolymerization) or with other monomer(s) (copolymerization) to form the hyperbranched polymeric dyes in which dye chromophores are incorporated into the backbone.

Specific examples of hyperbranched polymeric dyes useful in the invention include the following structures:

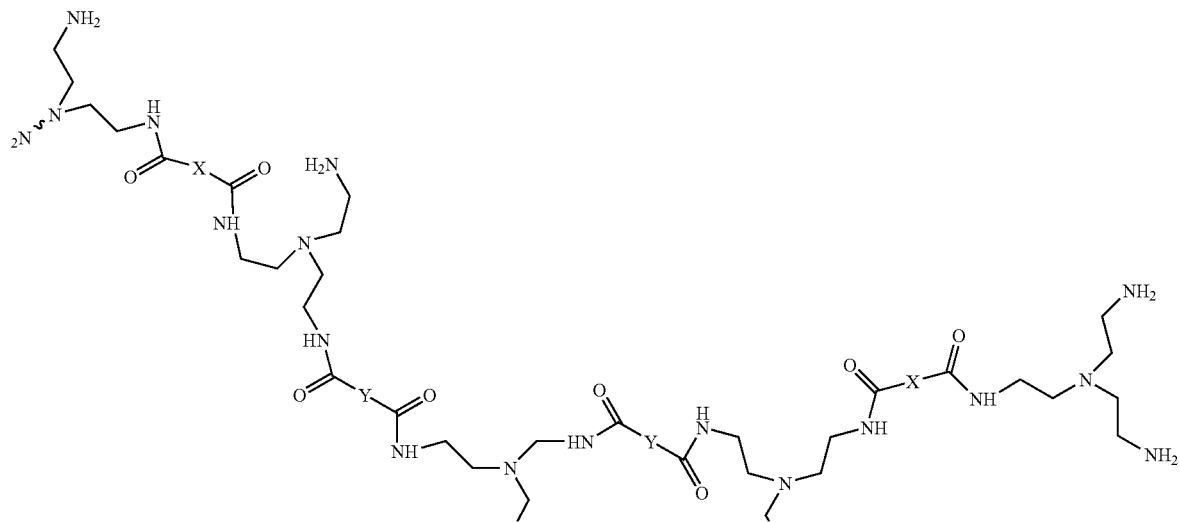
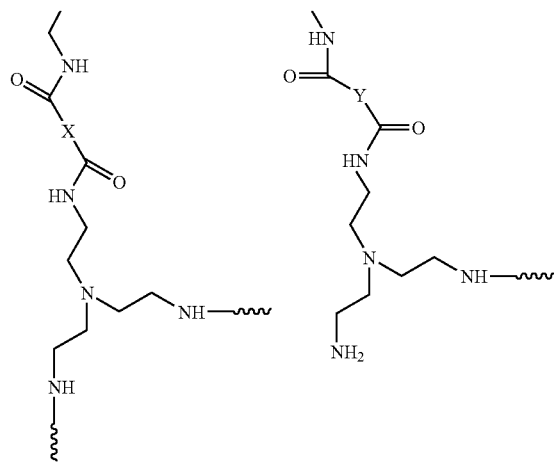
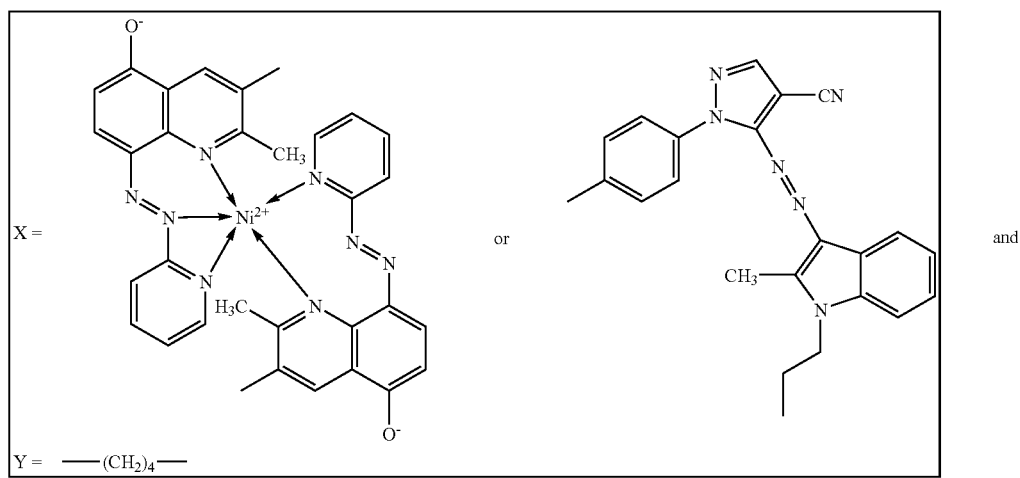

-continued

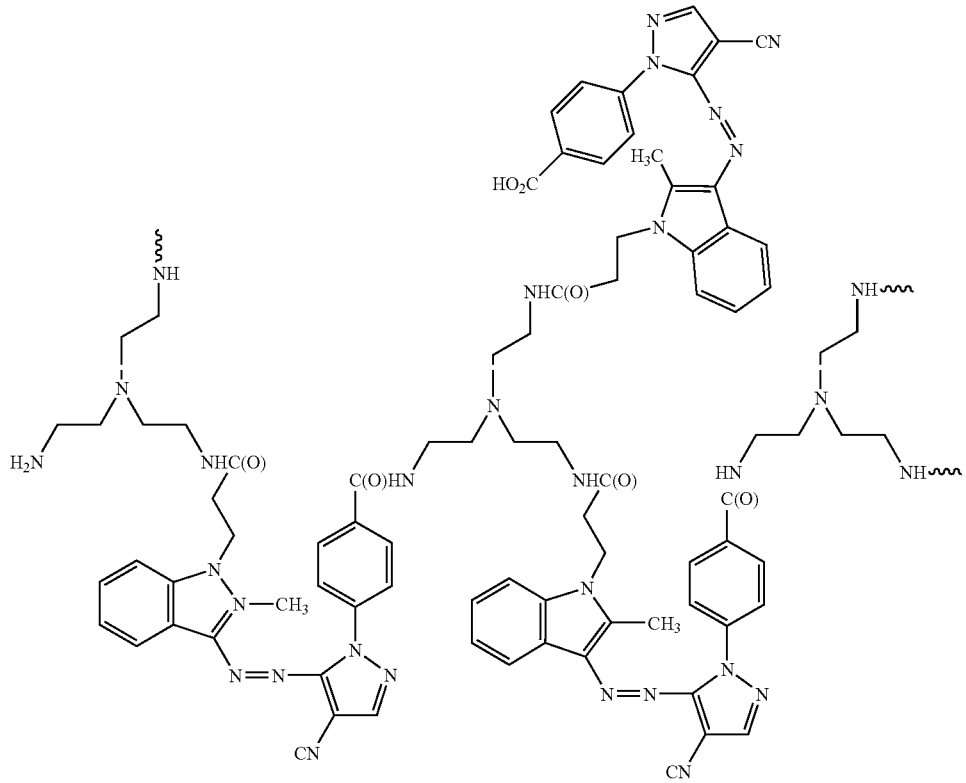

In general, the above hyperbranched polymeric dyes have a molecular weight from about 500 to about 50,000 and comprise from about 0.2 to about 20%, preferably from about 0.5 to 8%, by weight of the ink jet composition.

A humectant is employed in the inkjet composition of the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition of the invention is diethylene glycol, glycerol, or diethylene glycol monobutylether.

Water-miscible organic solvents may also be added to the aqueous ink of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic.

A biocide may be added to the composition of the invention to suppress the growth of microorganisms such as molds, fungi, etc. in aqueous inks. A preferred biocide for the ink composition of the present invention is Proxel® GXL (Zeneca Specialties Co.) at a final concentration of 0.0001-0.5 wt. %.

The pH of the aqueous ink compositions of the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition of the invention may comprise, for example, the following substituents by weight: hyperbranched polymeric dye (0.2-20%), water (20-95%), a humectant (5-70%), water miscible co-solvents (2-20%), surfactant (0.1-10%), biocide (0.05-5%) and pH control agents (0.1-10%).

Additional additives which may optionally be present in the ink jet ink composition of the invention include thickeners, conductivity enhancing agents, anti-kogation agents, drying agents, and defoamers.

The ink jet inks provided by this invention may be employed in ink jet printing wherein liquid ink drops are applied in a controlled fashion to an ink receptive layer substrate, by ejecting ink droplets from a plurality of nozzles or orifices of the print head of an inkjet printer.

Ink-receptive substrates useful in inkjet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following example illustrates the utility of the present invention.

EXAMPLES

The following dyes were used to prepare the hyperbranched polymeric dyes:

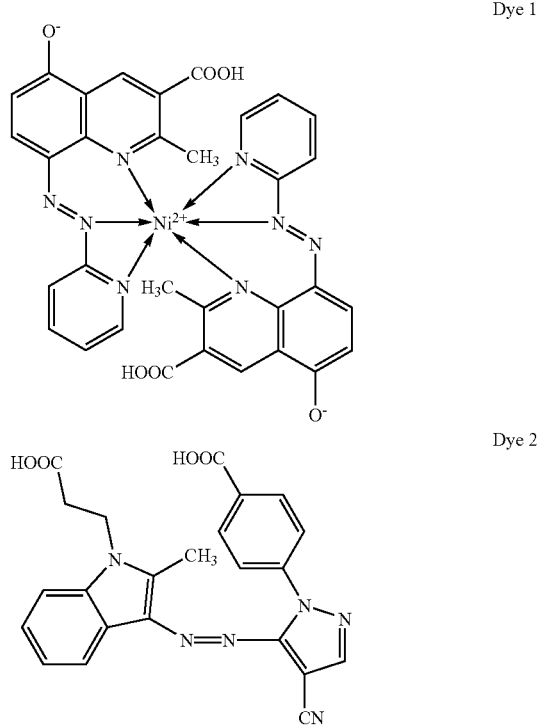

Dye 1

Dye 2

Synthesis of Hyperbranched Polymeric Magenta Dye HBPD-1

Tris(2-aminoethyl)amine (0.73 g), adipic acid (0.35 g), and magenta Dye 1 (0.35 g) were dissolved in 11:1 1-methyl-2-pyrrolidinone/pyridine (70 wt. % relative to total amount of starting materials). Triphenyl phosphite (100 mol. % of amine) was slowly added into the solution. The reaction mixture was heated at 80° C. for 3 hours under nitrogen. The solution was precipitated from cold ether and purified by dialysis with water using a 1000 MW cut-off bag and followed by freeze drying.

Synthesis of Hyperbranched Polymeric Yellow Dye HBPD-2

Tris(2-aminoethyl)amine (0.87 g), adipic acid (0.15 g), and yellow Dye 2 (0.44 g) were dissolved in 11:1 1-methyl-2-pyrrolidinone/pyridine (70 wt. % relative to total amount of starting materials). Triphenyl phosphite (100 mol. % of amine) was slowly added into the solution. The reaction mixture was heated at 80° C. for 3 hours under nitrogen. The solution was precipitated from cold ether and dried at 40° C. under vacuum overnight.

Synthesis of Hyperbranched Polymeric Yellow Dye HPBD-3

Tris(2-aminoethyl)amine (0.59 g), adipic acid (0.15 g), and yellow Dye 2 (0.44 g) were dissolved in 11:1 1-methyl-2-pyrrolidinone/pyridine (70 wt. % relative to total amount of starting materials). Triphenyl phosphite (100 mol. % of amine) was slowly added into the solution. The reaction mixture was heated at 80° C. for 3 hours under nitrogen. The solution was precipitated from cold ether and dried at 40° C. under vacuum overnight Synthesis of Hyperbranched Polymeric Yellow Dye HPBD-4

Tris(2-aminoethyl)amine (0.44 g), yellow Dye 2 (0.45 g) were dissolved in 11:1 1-methyl-2-pyrrolidinone/pyridine (70 wt. % relative to total amount of starting materials). Triphenyl phosphite (100 mol. % of amine) was slowly added into the solution. The reaction mixture was heated at 80° C. for 3 hours under nitrogen. The solution was precipitated from cold ether and dried at 40° C. under vacuum overnight.

Comparative Example 1 (C-1)

Non-Polymeric Dye

To prepare a comparative inkjet ink, 0.055 g of Dye 1, 0.05 g Surfynol® 465 (Air Products Inc.), 0.6 g glycerol, 0.1 g triethanolamine, and 1.2 g diethylene glycol were added to 8.05 g distilled water. The final ink contained 0.55% dye, 0.50% Surfynol® 465, 6.0% glycerol and 2.0% diethylene glycol. The solution was filtered through a 3 µm polytetrafluoroethylene filter and filled into an empty Hewlett-Packard HP520 ink jet cartridge.

Comparative Example-2 (C-2)

Non-Polymeric Dye

This ink was prepared similar to Comparative Ink 1 except that Dye 2 was used instead of Dye 1.

Example 1 of the Invention (I-1)

This ink was prepared similar to Comparative Ink 1 except that hyperbranched polymeric dye (HBPD-1) was used instead of Dye 1. To prepare this ink, 0.5 g of HBPD-1, 0.05 g Surfynol® 465, 0.6 g glycerol, and 1.2 g diethylene glycol were added to 7.65 g distilled water. The final ink contained 5% polymeric dye, 0.50% Surfynol® 465, 6.0% glycerol and 12.0% diethylene glycol. The solution was filtered through a 3 µm polytetrafluoroethylene filter and filled into an empty Hewlett-Packard HP520 ink jet cartridge.

Example 2 of the Invention (I-2)

This ink was prepared similar to Example 1 except that hyperbranched polymeric dye (HBPD-2) was used instead of hyperbranched polymeric dye (HBPD-1).

Example 3 of the Invention (I-3)

This ink was prepared similar to Example 1 except that hyperbranched polymeric dye (HBPD-3) was used instead of hyperbranched polymeric dye (HBPD-1).

Example 4 of the Invention (1-4)

This ink was prepared similar to Example 1 except that hyperbranched polymeric dye (HBPD-4) was used instead of hyperbranched polymeric dye (HBPD-1).

Printing

Elements were prepared using test images consisting of a series of 21 variable density patches, approximately 15 by 13 mm in size, ranging from 5% dot coverage to 100% dot coverage printed onto commercially available Epson Premium Glossy Paper, Cat. No S041286, Konica QP Photo IJ Paper (Catalog No. KJP-LT-GH-15-QP PI), Kodak Photographic Quality Paper, Cat. No 800 6298.a with a Hewlett-Packard HP DeskJet® 520 ink jet printer, using the above inks. The elements were allowed to dry for 24 hours at ambient temperature and humidity.

Stability Tests

The above elements were then placed in an ozone chamber (~100 ppb ozone level, 50% relative humidity) for four weeks. Additional elements were subjected to a smear test in a humidity chamber at 38° C., 80% relative humidity for one week. The Status A reflection densities of the maximum density patch of the elements were measured using an X-Rite® 414 densitometer before and after the fade and smear tests. The percentages of the Status A densities retained for the 100% dot coverage patches were calculated and are listed in Tables 1 and 2. For the smear test, a percentage of density retained higher than 100% indicates that there is a smear problem, and the deviation from 100% shows the degree of smear.

TABLE 1

| Element Containing Example Ink | Receiver | Ozone Test (% Retained) |
|---|---|---|
| C-1 | Epson Premium Glossy Paper | 52 |
| C-1 | Konica QP | 53 |
| I-1 | Epson Premium Glossy Paper | 88 |
| I-1 | Konica QP | 73 |

TABLE II

| Element Containing Example Ink | Receiver | Smear Test (% Retained) |
|---|---|---|
| C-2 | Kodak Photographic Quality Paper | 167 |
| C-2 | Konica QP | 123 |
| I-2 | Kodak Photographic Quality Paper | 102 |
| I-2 | Konica QP | 104 |
| I-3 | Kodak Photographic Quality Paper | 96 |
| I-3 | Konica QP | 100 |
| I-4 | Kodak Photographic Quality Paper | 97 |
| I-4 | Konica QP | 105 |

The above results show that the elements of the invention had improved ozone stability and smear resistance as compared to the control elements.

The invention has been described in detail with particular reference to certain preferred embodiments thereof, but it will be understood that variations and modifications can be effected within the spirit and scope of the invention.

What is claimed is:

1. An ink jet ink composition comprising water, a humectant, and a water-soluble hyperbranched polymeric dye comprising a hyperbranched polymer having a dye chromophore and a hydrophilic group incorporated into the polymer base chain.

2. The composition of claim 1 wherein said hyperbranched polymer having a dye chromophore and a hydrophilic group incorporated into the base chain thereof is a polyamide, polyester, polyether, vinylic polymer, polyimine, polyesteramide or polyurethane.

3. The composition of claim 1 wherein said hyperbranched polymer having a dye chromophore and a hydrophilic group incorporated into the polymer base chain is prepared by a chain polymerization of a monomer of the formula $M^1$-$R^7$-$M^2_m$ wherein $R^7$ is a linear or branched alkyl, carbonyl, or aromatic moiety containing a dye chromophore and $M^1$, $M^2$ and m are reactive groups that react independently of each other in which $M^1$ is a polymerization group and $M^2$ is a precursor of a moeity $M^{2*}$ which initiates the polymerization of $M^1$ as a result of being activated; and m is an integer of at least 1.

4. The composition of claim 1 wherein said hyperbranched polymer having a dye chromophore and a hydrophilic group incorporated into the polymer base chain is prepared by a condensation or addition polymerization of a monomer of the formula $M^3$-$R^7$-$M^4_p$ wherein $R^7$ is a linear or branched alkyl, carbonyl, or aromatic moiety containing a dye chromophore; $M^3$ and $M^4$ are groups that undergo a condensation or addition reaction; and p is an integer of at least 2.

5. The composition of claim 1 wherein said hyperbranched polymer having a dye chromophore and a hydrophilic group incorporated into the polymer base chain is prepared by a condensation or addition polymerization of a monomer of the formula $R^8$-$M^5_q$ and $R^9$-$M^6_t$ wherein $R^8$ and $R^9$ are each independently a linear or branched alkyl or aromatic moiety, at least one of which contains a dye chromophore $M^5$ and $M^6$ are groups that undergo a condensation or addition reaction; q is an integer of at least 2; and t an integer of at least 3.

6. The composition of claim 1 wherein said dye chromophore is a mono- or poly-azo dye, basic dye, phthalocyanine dye, methine or polymethine dye, merocyanine dye, azamethine dye, quinophthalone dye, thiazine dye, oxazine dye, anthraquinone or metal-complex dye.

7. The composition of claim 6 wherein said mono- or poly-azo dye is a pyrazoleazoindole.

8. The composition of claim 6 wherein said metal-complex dye is a transition metal complex of an 8-heterocyclylazo-5-hydroxyquinoline.

9. The composition of claim 1 wherein said humectant is diethylene glycol, glycerol or diethylene glycol monobutylether.

10. The composition of claim 1 wherein said hyperbranched polymeric dye comprises about 0.2 to about 20% by weight of said ink jet ink composition.

* * * * *

UNITED STATES PATENT AND TRADEMARK OFFICE
CERTIFICATE OF CORRECTION

PATENT NO.        : 7,273,897 B2                                       Page 1 of 1
APPLICATION NO.   : 09/918584
DATED             : September 25, 2007
INVENTOR(S)       : Jin-Shan Wang et al.

It is certified that error appears in the above-identified patent and that said Letters Patent is hereby corrected as shown below:

| | |
|---|---|
| Title page (74) Attorney, Agent, or Firm | after "Kathleen" delete "Neaner" and insert --Neuner-- |
| Claim 3, Column 12, Line 19 | delete "an M1, M2 and m" and insert -- ; M1 and M2 -- |
| Claim 3, Column 12, Line 21 | delete "moeity" and insert -- moiety -- |
| Claim 5, Column 12, Line 43 | after "t" insert -- is -- |

Signed and Sealed this

Fourth Day of December, 2007

JON W. DUDAS
*Director of the United States Patent and Trademark Office*